| United States Patent Office | 3,112,240
Patented Nov. 26, 1963 |

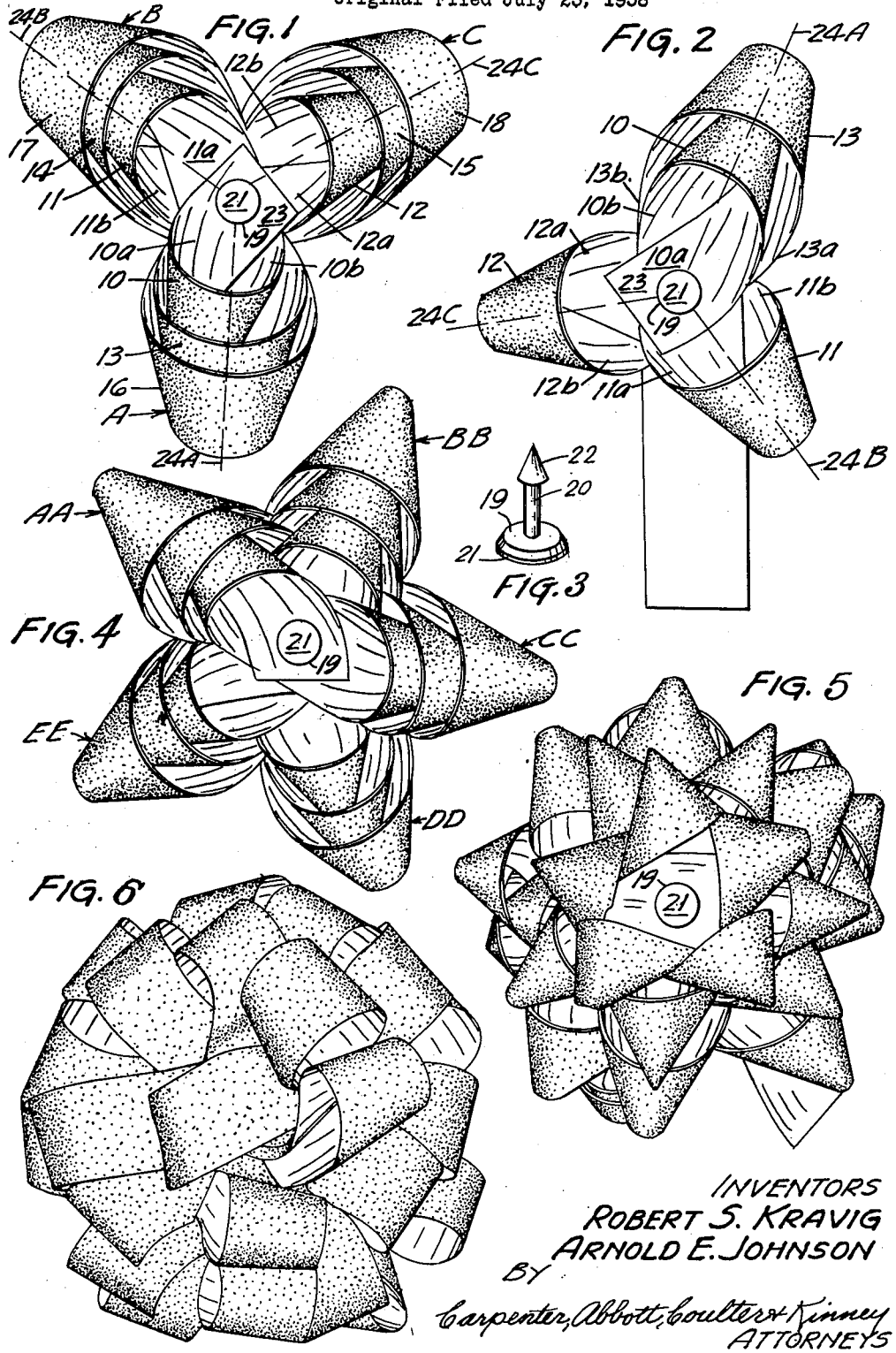

3,112,240
DECORATIVE BOWS
Robert S. Kravig, Bloomington, and Arnold E. Johnson, Maplewood, Minn., assignors to Minnesota Mining and Manufacturing Company, St. Paul, Minn., a corporation of Delaware
Continuation of application Ser. No. 855,484, Oct. 29, 1959, which is a division of application Ser. No. 750,396, July 23, 1958, now Patent No. 2,933,223, dated Apr. 19, 1960. This application Oct. 4, 1962, Ser. No. 228,497
5 Claims. (Cl. 161—10)

The present invention relates to the art of decorating such things as gift packages, displays, tables, holiday scenes, and the like with decorative bow structures. More particularly, this invention is directed to the provision of novel decorative bow structures formed of strip material such as decorative ribbon. This application is in the nature of a continuation of our earlier copending application Serial No. 855,484, filed October 29, 1959, now abandoned, which in turn is a division of our earlier application Serial No. 750,396, filed July 23, 1958, now United States Patent No. 2,933,223, granted April 19, 1960. Our said patent relates to fabricating machines for rapidly forming decorative bow structures, including those hereof, virtually in their completed state, and to methods for fabricating such bows.

The preparation of fancy, attractive displays, holiday decorations, and particularly gift packages using decorative ribbons and papers has become a highly commercialized business. Manufacturers of decorative ribbons and decorative wrapping papers and such like have vigorously promoted the use of their commodities in the preparation of attractively wrapped packages. Many industrial concerns, for example department stores and novelty shops, have organized separate departments almost exclusively engaged in gift wrapping commodities purchased elsewhere in their stores. Particularly around holiday times, these departments gift wrap large numbers of packages every working day. Others have made a business of fabricating decorative bow structures in mass quantities for sale to the home users, so that the latter can wrap their own gifts and packages, and formulate their own decorative displays without having to tie or fabricate decorative bows themselves.

Still other concerns, as part of promotional endeavors, have utilized decorative ribbon products in the commercialization of their products. For example, during the various holiday seasons distilleries and other vendors of beverage goods often sell their bottled products fancily wrapped in packages employing ornamental decorative ribbon bows, the object being that the product can be given by the purchaser to another as a gift without any further ornamental or decorative wrapping being necessary. Promotional advertising of such concerns in magazines, newspapers, etc., emphasizes the attractively packaged goods in an effort thereby to induce sales to those buying the products specifically as gifts for others.

Such wide and increasing commercial usage of decorative ribbon products requires that ribbon products be susceptible of production in large quantities in a relatively short time. The fewer manual operations involved the better. However, in order to be sufficiently pleasing and unique so that the purchasing public is willing to use the bow products on personal gifts and packages, the bows must be individualistic in appearance. That is, they should not be stereotyped or non-personal. Ordinarily mass production, on the other hand, and the provision of attractive, unique, individualistic and artistic appearing bow products, on the other, are antagonistic desires. The present invention is especially concerned with the mutual satisfaction of these wants.

Various literature articles and patents have issued from time to time over recent years relating to the provision of decorative structures and to machines and devices for making the same. The ornamental pompon of puff bow, fashioned from many loops of ribbon to resemble a tufted ball, has become quite popular. This popularity is due in large part to the ease and speed with which the pompon bows can be formed from a prefabricated hank of decorative ribbon, all in accordance with McMahon Reissue Patent No. 23,835, granted June 8, 1954. Machines by which the prefabricated hanks of ribbon can be manufactured rapidly and in large numbers are disclosed and claimed in Duncan Patent No. 2,872,086, granted February 3, 1959, on application Ser. No. 526,856, copending herewith, as a continuation-in-part of Duncan application Ser. No. 366,844, filed July 8, 1953, now abandoned. Although the ornamental pompon bows formed in accordance with the aforesaid McMahon and Duncan patents have satisfied a very real need in that they are one of the very first types of bows consisting of many radiating loops of ribbon to be manufactured even partly in mass production, nevertheless very substantial manual operations, i.e., the forming of the bow from the prefabricated hank of ribbon, are involved in their manufacture. However, it is desirable that as many manual operations as possible be eliminated from operations wherein large numbers of completed bows are manufactured.

Others have concerned themselves with the fabrication of decorative bows from lengths of strip material. James Patent No. 2,681,525, granted June 22, 1954, discloses bows formed from continuous lengths of strip material preformed to a desired shape or perforated condition. However, such bows as are disclosed in said James patent, as a practical matter, are required to be formed by hand procedures and are not susceptible of production in large quantities. Moreover those bows disclosed wherein loops radiate in many directions from the bow center are so formed that some loops have one surface of the ribbon exposed outwardly, and the remaining loops have the opposite ribbon surface exposed outwardly. Such bows thus are not advantageously formed of commercially available decorative ribbons wherein one surface, i.e., the face surface, is provided with a high sheen and the opposite or back surface has a different, such as a rather dull finish. Bows made from commercial ribbons of this type contain many dull appearing loops randomly interspersed with loops wherein the face surface of high sheen is exposed. More recently, Wanchek Patent No. 2,841,905, granted July 8, 1958, likewise concerns decorative bows of continuous strip material which is preperforated in order to provide a series of spaced apertures to accommodate formation of the bow loops, but in some respects certain bows pictured appear aesthetically somewhat similar to certain bows hereof. Like the bow structures disclosed in the aforesaid James Patent No. 2,681,525, the Wanchek structures, as a practical matter, require manual manipulation of the ribbon in the foramtion of each of the bow loops, and have not seen insofar as we are aware, significant usage where even moderately large quantities are required at a time such as in the commercial use of preformed bows above referred to.

James Patent No. 2,774,164, granted December 18, 1956, as a continuation-in-part of the aforementioned James Patent No. 2,681,525, discloses bows containing loops radiating in many directions from a central holding pin, and wherein a similar ribbon surface may be exteriorly exposed in all loops. But such bows as are disclosed in the latter James patent are formed of individually formed loops each consisting of a separate independent strip. They are not susceptible of rapid production in large quantities, and are also rather limited in type and style. Welch Patent No. 2,763,080, granted September 18, 1956, and Ruiz et al. Patent No. 2,666,249, granted January 19, 1954, also are concerned with the formation of decorative bow structures.

To our knowledge no one heretofore has provided commercially preformed individualistic-appearing attractive ornamental bow structures of various shapes and configurations fashioned from continuous lengths of ribbon wherein the loops of ribbon are formed and disposed along numerous radii about the bow center (so that the loops are spread around said center similar to the arrangement of the petals of a flower), and wherein the loops of the bow, particularly in their curved or bight portions, are smoothly arcuate with the same surface of the ribbon exposed outwardly in each loop. Nor have methods and machines heretofore been devised, insofar as we are aware, for rapidly fabricating such bow structures in large quantities. Our invention is principally directed toward the satisfactory solution of these problems.

The decorative bows of the present invention are highly suited for use as ornamental decorations, particularly the packaging or gift wrapping fields; but elsewhere as well. For example, they form distinctive decorations for window displays, table displays, Christmas trees and such like. The ornamental bows hereof comprise a continuous length of strip material (which is free of pre-perforations, i.e. free of spaced predisposed holding member receiving apertures) formed into a succession of loops radiating from a common point at the bow center along at least three radii. The loops of the bow are so fashioned that the same surface of the ribbon is exposed similarly outwardly in each loop. The two ends of the ribbon length of which the bow is formed terminate adjacent opposite surfaces of the bow, with central holding means retaining the several loops together in the desired relation at the bow center, without substantial excision or removal of ribbon material to accommodate the holding member. In preferred bow structures the legs of each loop intersect at the bow center in face-to-back relation and remain essentially uncreased and unfolded while the bight portion of the loops remain smoothly arcuate, whereby unique radially symmetrical arrangements of loops can be obtained with the loops taking a generally conoidal shape with their small ends radially outermost.

The manner in which these and other objectives and advantages are attained by and in accordance with our invention will be readily apparent from the following detailed description of illustrative embodiments, especially in light of the accompanying drawings, wherein like reference characters refer to corresponding parts in the several views, and in which:

FIGURE 1 is a plan view of a three-point bow of the present invention;

FIGURE 2 is a plan view of a three-point bow shown in a partially completed state in order to illustrate the manner in which the same is manufactured;

FIGURE 3 is a perspective view of a central binding pin which can be used in the fabrication of the bows hereof;

FIGURE 4 is a plan view of a bow hereof containing five groups of radially symmetrically disposed loops to give the appearance of a five-point star bow;

FIGURE 5 is a plan view of a randomly disposed multipointed decorative bow hereof; and FIGURE 6 is a plan view of a puff-type bow, fabricated on the novel machine hereof, wherein the loops of the bow are not of conoidal shape.

Referring now to FIGURES 1 and 2 the three-point bow shown comprises a continuous length of strip material formed into a succession of radially disposed loops 10, 11, 12, 13, 14, 15, 16, 17 and 18. Each of the loops is composed of a pair of legs, e.g., 10a and 10b of loop 10, 11a and 11b of loop 11, 12a and 12b of loop 12, and a curved portion or bight connecting the legs. The legs of each loop intersect in face-to-back relation at a generally central point common with the points of intersection of the legs of the other loops. Actually the loops are not separate and distinct, all being successively formed from the same length of strip material. Each loop has a leg common with the opposite leg of each loop in immediate succession therewith. For instance, leg 10b of loop 10 is common with leg 11a of loop 11, the only loop in immediate succession with loop 10; while in loop 12, also in immediate succession with loop 11, leg 12a is common with the opposite leg 11b of loop 11.

The loops of the preferred bow shown in FIGURES 1 and 2 are of generally conoidal shape, having an appearance akin to that of a cone. The small end of the loop is radially outermost, the loops thus imparting the illusion of pointing outwardly like the points of a star.

At the central point where the loop legs intersect the loops are bound together in generally fixed relation by a pin member 19 upon which said legs are impaled as the loops are formed. It will be apparent that there is at least some lateral displacement of the ribbon in the several superposed loop legs at areas immediately adjacent to where pierced by the pin on which impaled, so that the ribbon is slightly pushed aside or bunched in making way for the holding member. There is no substantial excision of ribbon to accommodate the holding member as in the instance of bows of certain prior art made from preperforated or prepunched ribbon. The displaced ribbon (apparently in seeking its original position and/or because slightly bunched) in the loop leg ribbon layers seems to urge holding forces against the holding member and against other adjacent layers so that once the bow is formed the loops tend to hold their relative position and resist movement with respects to one another, even where a single "shaft" holding member such as the pin shown in FIGURE 3 is employed.

As shown in said FIGURE 3 said pin comprises a shaft 20, a broad flat base 21 and a conical point 22 the inner surface of which has a diameter exceeding that of shaft 20. Thus the point 22 and the head 21 keep the legs of the loops from radially slipping off of shaft 20 once the strip material has been impaled over the point 22. This is true with respect to point 22 even though the ribbon initially was impaled upon the pin over said point, and particularly true with strip material which contains fibers in both the lengthwise and cross directions, such as "Sasheen" brand decorative ribbon available from the Minnesota Mining and Manufacturing Company, St. Paul, Minnesota.

The conoidal-shaped loops are arranged into three families of loops uniformly radially distributed about pin 19, these families each forming a "point" in the bow. Loops 10, 13 and 16 form family A. Loops 11, 14 and 17 form family B. Loops 12, 15 and 18 form family C. The loops in each family, for example loops 10, 13 and 16, are similarly shaped with the legs of each loop of the family intersecting at substantially the same angle. However, the loops within each family are of different length, e.g., the length of loop 13 extends radially outwardly of and about loop 10; similarly the length of loop 16 is greater than that of loop 13, loop 16 thus extending radially outwardly of and about both loops 10 and 13. Also, at the center of the bow similar legs of the loops in each family are in substantial registry and in superposition. The loops of each family have a common radial bisector 24A, 24B and 24C. The angle between the bisectors of adjacent families of loops, by which the radial disposition of the families is measured, in the three-point bow shown is about 120 degrees.

Since the bow is a symmetrical one, corresponding loops of each family are of substantially identical lengths and shape. That is, loops 10, 11 and 12 are of the same length and shape, as are loops 13, 14 and 15, and as are loops 16, 17 and 18.

As can be seen from the three-dimensional appearance of FIGURES 1 and 2, the loops of the three-point bow are formed about the head or base end 21 of pin 19, as distinguished from the pointed end of said pin. Hence, the logical front or face surface of the bow is that to which the pin base 21 is adjacent. Such is also the case with the other bows hereof wherein the loop legs intersect in uncreased face-to-back relation. Accordingly, bows of this type conveniently can be attached to a package wrapper such as paper or thin cardboard by pressing the pin of the bow into the package wrapper much like pressing a thumb tack into place. The point 22 pierces the package wrapper and, once on the inside of the wrapper, retains the bow in place.

The manner in which the bow in FIGURE 1 can be commercially formed is described in our aforementioned Patent No. 2,933,223, in connection with the illustrative bow fabricating machine therein disclosed. Also, and for purposes of illustration, our novel bow structure can be formed as will be described with the aid of FIGURE 2. A continuous length of decorative ribbon is grasped at two spaced points along its length, one of which points is adjacent the free end 23 of the ribbon. The portion of the ribbon between said points is then twisted lengthwise and the ribbon at said two points brought together in face-to-back relation to form a loop 10 with the legs 10a and 10b thereof intersecting at an angle of 60 degrees. The twist employed in forming the loop is in a single direction, i.e., is unidirectional. It is sufficient to permit the face surface of one leg 10a, to be brought in contact with the back surface of the leg 10b, i.e., in face-to-back relation, where the two legs overlap, while the bight of the loop remains smoothly arcuate and the legs remain smooth and uncreased. Pin 19 is then inserted through legs 10a and 10b where they intersect, by impaling said legs over the point 22 and on to shaft 21 of pin 19. Thereby the loop legs are retained together.

The first loop 10 is then grasped about pin 19 and the ribbon is grasped at a third point along the continuation of leg 10b at a distance from the pin equal to the length of loop 10. The ribbon between the pin and said third point is twisted in the same direction as before and at the same time the ribbon, at said third point, is brought into contact with and impaled on pin 19 in face-to-back relation with the portion of ribbon forming continuation of leg 10b. Thus is defined a second loop 11 with legs 11a (the said continuation of leg 10b) and 11b intersecting at an angle of 60 degrees. Loop 12, having legs 12a and 12b intersecting in face-to-back relation at an angle of 60 degrees with leg 12a being common with leg 11b, is similarly formed, the ribbon being twisted in correspondingly the same direction as in formation of the previous loops 10 and 11. The continuation of leg 12b will be seen to be in substantial registry and in superposition with leg 10a of loop 10, three loops radially symmetrically arranged about central pin 19 having been formed.

Loop 13 is then formed in a similar manner as were the previous loops 10, 11 and 12, except that the length thereof is greater than that of the previous loops. This is accomplished by grasping the ribbon at a point along the continuation of leg 12b a distance from pin 19 greater than the length of the previous loops. The ribbon is twisted in the same direction as before and the ribbon impaled on pin 19 to define loop 13 having legs 13a and 13b intersecting in face-to-back relation at an angle of 60 degrees, leg 13a being a continuation of leg 12b of loop 12. Since the angle of intersection of the legs of 13a and 13b of loop 13 is the same as the angle of intersection of legs 10a and 10b, leg 13a lies in substantial registry and in superposition with leg 10a, and leg 13b lies in substantial registry and superposition with leg 10b. Thus loop 13 extends radially outwardly of and about loop 10. Also, the two loops 10 and 13 have a common radial bisector. These two loops define a part of family A, one of the three radially symmetrically disposed families which form the bow of FIGURES 1 and 2.

The bow is then completed by similarly forming loops 14 and 15, about loops 11 and 12, respectively. Then loops 16, 17 and 18, of greater length than of the previously formed loops, are similarly formed radially outwardly of and about loops 13, 14 and 15, respectively.

Since the loops of the bow are successively formed of a continuous length of ribbon, and further since the loop legs and their continuations (forming legs of other loops) extend straight and uncreased, the angle at which the legs of each loop intersect is determinative of the radial disposition of the several loops about the bow center, as measured between adjacent radial bisectors. Thus it is the 60 degree angle of intersection of the legs of each loop in the bow shown in FIGURES 1 and 2 which permits the formation of the symmetrical three-point bow. If such angle in the first loop were greater, or lesser than 60 degrees, the radial bisector thereof and that of the next loop, formed like the first, would define an angle of less than 120 degrees, and greater than 120 degrees, respectively. Hence, in such cases, three symmetrically disposed loops could not result without creasing or bending the loop legs.

Other bows having symmetrically arranged families of loops, wherein the legs of each loop intersect in uncreased face-to-back relation, can be formed in accordance with the principles hereof. For example, a symmetrical five-point bow, such as that shown in FIGURE 4, can be made where the legs of each loop intersect at an angle of 36 degrees, the length of each of the second five loops being greater than that of the first five, and the length of each of the third five loops being greater than that of the second. Bows also can be formed wherein the loops are not arranged in individual symmetrical groups upon appropriate choice of angles of loop leg intersection, due regard being had for the geometric principles involved. Such a bow is shown in FIGURE 5. Bows also can be formed in accordance with the present invention wherein the loops are not conoidal, but instead appear to be bent back over on themselves; see FIGURE 6. Further, although preferred bows hereof have straight uncreased loop legs, bows also can be formed of loops wherein the loop legs are twisted so as to be folded or creased adjacent the bow center. As will be shown hereinafter, the bow shown in FIGURE 6 can be fashioned in this manner. Many other bows, containing various numbers and arrangements of loops, and combinations thereof, can be formed in accordance with the teachings hereof and in our said Patent No. 2,933,223, and reference is thus made to the description therein.

As is apparent, the nature and position of the loops of our novel bows depend importantly upon the amount of twist or index in the span of ribbon forming each loop. Thus to form a particular bow the appropriate angle of index of the bow is first ascertained. In fabricating preferred bows hereof each loop must be twisted 180 degrees, in addition to the degree of unidirectional twist necessary for the loop legs to intersect. This accommodates the legs of the loop being brought into face-to-back relation so that the loop legs remain uncreased or unbent and the loop bights remain smoothly arcuate. Accordingly in computing the desired degree of twist 180 degrees are added to the desired angle of leg intersection. It will be recalled that in the three-point "star" bow of FIGURES 1 and 2, the legs of each loop intersect in face-to-back relation at an angle of 60 degrees. Therefore, to form such bow structure the ribbon is twisted 240 degrees for each loop formed (180 degrees of rotation accommodates the face-to-back relationship and 60 degrees defines the desired angle of loop leg intersection).

The first three loops of the bow of FIGURES 1 and 2 are formed of equal spans of ribbon material. The succeeding three loops are also formed of equal spans of ribbon material each being of greater length than the spans forming the first three, with the remaining three loops being constituted of still larger spans of ribbon. The legs of the loops are each impaled on a central pin as they are formed, resulting in the bow shown in FIGURE 1.

The five-point bow shown in FIGURE 4 is formed in a similar manner except that the number of loops formed successively out of equilength spans of ribbon is five instead of three. Also, upon consideration of the geometric principles involved, it will be seen that a five-point bow can be formed where the legs of each loop intersect at an angle of either 36 or 108 degrees. Where there is a choice, the minimum angle of leg intersection preferably is selected. Firstly, the bulk of the loop thereby is reduced minimizing the interference between adjacent loops. Secondly, the sharper the angle of leg intersection, so long as the angle is not so acute that the legs and bight fold or crease, the more sharply pointed the conoidal loop bights appear.

In the five-point bow, the ribbon is thus preferably twisted 216 degrees, 180 degrees of rotation accommodating the face-to-back relationship, and 36 degrees defining the desired angle of loop leg intersections. The smaller loop of family AA is first formed following which the corresponding loop in the family CC is formed. Then the loop in position EE, then the loop in position BB and finally the loop in position DD are formed in the order enumerated. The family of intermediate length loops and the family of longest length loops are then formed in similar sequence.

In fabricating the many various possible bows hereof having radially symmetric families of loops, and wherein the legs of each loop intersect in uncreased face-to-back relation with each loop leg being common with a leg of each loop immediately in succession therewith, we have found the following formula useful in determining a preferable twist angle of the ribbon:

$$D = \frac{360}{G} \times I$$

where G represents the number of families of loops to be symmetrically radially disposed, and has a value greater than two; I represents the smallest integer which will cause the value of D to exceed the 180 degrees necessary to accommodate the uncreased face-to-back relation of loop legs; and D represents the resulting desired degree of twist.

Where the value of D is computed for a bow having an even number of "points," and said even number is divisible by two to yield an odd integer, said value will equal the value of D computed for a bow having a number of points corresponding with said odd integer. Thus, for example, the value of D for a six-point bow is 240 degrees—the same as the value of D for a three-point bow. In such case the bow having the smaller number of points preferentially is formed when ribbon is twisted always in the same direction. However, the bow having the larger even number of symmetrically disposed points or families of symmetrically disposed points can be fashioned by modifying the operation slightly. This may be done by first forming one-half of the said even number of loops by twisting in one direction the computed angle D each time; then the remaining one-half of the loops are formed by twisting the ribbon through angle D each time in the direction opposite to the formation of the first one-half of the loops.

The reverse twisting causes the second half of the loops to be twisted oppositely from the first (each loop, however, being unidirectionally twisted) and thus to fall in place between loops of the first half. If additional series of loops of different size are to be added to form families of loops, each series is similarly applied.

The basis for the preferential formation of the "pointed" or star bows having the smaller number of loops, and the manner by which bows of twice the smaller number of loops can be formed will be apparent upon laying out, e.g., by generating on paper, the geometric configurations involved. It is to be noted, however, that as a rule we have found bows containing odd numbers of radially symmetrically disposed families of loops seem to be somewhat more uniformly shaped than those containing even numbers of families. Apparently this is because, in the latter type, legs of adjacent loops geometrically tend to lie on a common path. Since, this, of course, is not possible, some of the adjacent loops tend to deform. The angle of twist of the ribbon can be purposely controlled so that families of symmetrically disposed loops are not formed. This is accomplished simply by selecting an angle of twist for the ribbon which is a significant variant from any values of D as computed in the above formula. For example a bow like that depicted in FIGURE 5, containing conoidal-shaped loops, is not composed of families of loops, although it is symmetrical in appearance. It can be fabricated by employing an angle of twist of about 200 degrees, and forming many loops of equal length.

The greater the angle of intersection between the legs of each loop the less pointed the bight of the loops appear. Generally, loops whose legs intersect at greater than about 120 degrees, particularly where the loops are long in comparison with ribbon width, and less than 180 degrees, do not appear to be of conoidal shape. (Legs coming together at 180 degrees, of course, do not intersect.) Hence, by twisting the ribbon from about 300 to less than 360 degrees, bows are formed whose loops appear tufted, resembling those of the pompon or puff bow, with the loop bights having generally uniform curvature therein across the width of the ribbon (as opposed to the loops of conoidal shape, wherein the curvature in the loop bight increases across the ribbon width).

Where the ribbon is twisted less than an angle in the order of 180 degrees (or slightly more depending on the relative length of loop to width of ribbon), insufficient twist is present for the entire loop to form uncreased. Creasing should occur in the legs of the loop, and then only immediately adjacent the bow center. Then, the bight portions of bows composed of such loops remain smoothly arcuate and attractive, and the creased portions remain concealed at the bow center. The same surface of the ribbon is exposed outwardly in the loops. Such loops are not of conoidal shape, but rather resemble tufted loops. Accordingly, bows having the appearance of pompon or puff bows can be fashioned by forming many loops about the bow center, varying the lengths of loops or series of loops, if desired. Extremely attractive bows result, the bow of FIGURE 6 being exemplary of the type just described. When the bow is formed with the use of pin 19 (FIGURE 3), it may be undesirable for reasons of appearance to have the point of the pin exposed at the face surface of the bow. If so, after the bow is formed, the finally applied leg of the final loop formed can be folded back on itself, and impaled on the pin so as to conceal the point within said final loop.

From the foregoing description it will be apparent that many types and variations of bow structures can be formed all in accordance with the principles hereof. Multicolor bows can be fashioned, for example, by first forming a bow of small radial extent, followed by the formation of a larger bow of differently colored ribbon about the first bow. Other variations, undoubtedly, suggest themselves.

We claim:

1. A decorative bow comprising a continuous length of strip material formed into a succession of loops radiating from a generally central point along at least three radii, said length terminating with its ends adjacent opposite surfaces of the bow defined by said loops, said loops each having a first leg, a second leg overlying the first leg at said central point and a bight with each loop having one leg common with the opposite leg of each loop in immediate succession therewith, each of said loops having therein a unidirectional twist with the bight thereof being smoothly arcuate, the same surface of said strip material being exposed outwardly in each loop, the superposed layers of said strip material at said central point being impaled by central holding means which penetrates said layers and retains said loops together at said central point, the strip material of said layers being laterally displaced in areas immediately adjacent said holding means.

2. A decorative bow comprising a continuous length of strip material formed into a succession of loops radiating from a generally central point along at least three radii, said length being free of spaced predisposed holding member receiving apertures and terminating with its ends adjacent opposite surfaces of the bow defined by said loops, said loops each having a first leg, a second leg overlying the first leg at said central point and a bight with each loop having one leg common with the opposite leg of each loop in immediate succession therewith, each of said loops having therein a unidirectional twist with the bight thereof being smoothly arcuate, the same surface of said strip material being exposed outwardly in each loop, the superposed layers of said strip material at said central point being impaled by central holding means which penetrates said layers and retains said loops together at said central point, the strip material of said layers being laterally displaced in areas immediately adjacent said holding means.

3. A decorative bow comprising a continuous length of strip material formed into succession of loops radiating from a central point, said length terminating with its ends adjacent opposite surfaces of the bow defined by said loops, each of said loops having a first leg, a second leg and a bight with each loop having one leg common with the opposite leg of each loop in succession therewith, the legs of each loop intersecting in uncreased face-to-back relation at said point, said loops having a unidirectional twist to accommodate said intersecting relation and being of generally conoidal shape with the loop bights being smoothly arcuate, and a central holding pin passing through and retaining the loops together at said point, said loops further being arranged into a least three families uniformly radially distributed about said holding pin, each family containing a plurality of similarly shaped loops of different lengths with the loops of greater length extending radially outwardly of and about the loops of lesser length.

4. A decorative bow comprising a continuous length of strip material formed into a succession of loops radiating from a generally central point along at least three radii, said length being free of spaced predisposed holding member receiving apertures and terminating with its end adjacent opposite surfaces of the bow defined by said loops, said loops each having a first leg, a second leg overlying the first leg at said central point and a bight with each loop having one leg common with the opposite leg of each loop in immediate succession therewith, said loops having therein a unidirectional twist with loop legs being creased adjacent said central point and with the loop bights being smoothly arcuate and of generally uniform curvature across the width thereof, the same surface of said strip material being exposed outwardly in each loop, the overlying layers of said strip material at said central point being impaled by central holding means which penetrates said layers and retains said loops together at said central point, the strip material of said layers being laterally displaced in areas immediately adjacent said holding means.

5. A decorative bow comprising a continuous length of strip material formed into a succession of loops radiating from a generally central point along at least three radii, said length being free of spaced predisposed holding member receiving apertures and terminating with its ends adjacent opposite surfaces of the bow defined by said loops, said loops each having a first leg, a second leg and a bight with each loop having one leg common with the opposite leg of each loop in immediate succession therewith, each of said loops having therein a unidirectional twist with the bight thereof being smoothly arcuate, the same surface of said strip material being exposed outwardly in each loop, and central holding means retaining said loops together at said point.

References Cited in the file of this patent

UNITED STATES PATENTS

| | | |
|---|---|---|
| 2,806,313 | James | Sept. 17, 1957 |
| 2,841,905 | Wanchek | July 8, 1958 |